US012651950B2

(12) United States Patent
Chiba et al.

(10) Patent No.: US 12,651,950 B2
(45) Date of Patent: Jun. 9, 2026

(54) VIBRATION ACTUATOR WITH FRAME HAVING FIXING AND DAMPING PORTIONS HOLDING LEAF SPRING

(71) Applicant: FOSTER ELECTRIC COMPANY, LIMITED, Tokyo (JP)

(72) Inventors: Yusuke Chiba, Tokyo (JP); Takafumi Asukagawa, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 186 days.

(21) Appl. No.: 18/284,529

(22) PCT Filed: Mar. 16, 2022

(86) PCT No.: PCT/JP2022/011995
§ 371 (c)(1),
(2) Date: Sep. 27, 2023

(87) PCT Pub. No.: WO2022/209908
PCT Pub. Date: Oct. 6, 2022

(65) Prior Publication Data
US 2024/0186875 A1     Jun. 6, 2024

(30) Foreign Application Priority Data
Mar. 30, 2021     (JP) ................................. 2021-057490

(51) Int. Cl.
*H02K 33/02*     (2006.01)
*H02K 5/24*      (2006.01)
(52) U.S. Cl.
CPC ............... *H02K 33/02* (2013.01); *H02K 5/24* (2013.01)

(58) Field of Classification Search
CPC ...... H02K 35/00; H02K 35/02; H02K 7/1869; H02K 7/1876; H02K 33/00; H02K 33/02;
(Continued)

(56) References Cited

U.S. PATENT DOCUMENTS 5,973,422 A * 10/1999 Clamme ................ H02K 33/16
                                                           310/90.5
6,501,357 B2 * 12/2002 Petro .................. H01H 51/2209
                                                           335/229

(Continued)

FOREIGN PATENT DOCUMENTS

JP     2000354829     12/2000
JP     2009033864     2/2009
(Continued)

OTHER PUBLICATIONS

"International Search Report (Form PCT/ISA/210) of PCT/JP2022/011995", mailed on May 24, 2022, with English translation thereof, pp. 1-4.

*Primary Examiner* — Maged M Almawri
(74) *Attorney, Agent, or Firm* — JCIPRNET

(57) ABSTRACT
Assembling of the leaf spring and the damping member is facilitated and a vibration actuator with excellent vibration characteristic is provided. The vibration actuator mainly includes a cylindrical casing, a coil provided inside the casing, a mover vibrating along the vibration axis of the casing, a leaf spring in which an inner circumferential portion thereof is fixed to the mover, and a frame fixing the leaf spring to the casing. The frame includes a fixing portion provided in an outer circumferential portion of the leaf spring and a damping portion provided in a vibrating portion of the leaf spring.

11 Claims, 11 Drawing Sheets

(58) Field of Classification Search
 CPC .......... H02K 33/04; H02K 5/24; H02N 11/00;
  H02N 11/002; H02N 11/04
 USPC ............................................... 310/89, 15–28
 See application file for complete search history.

(56) References Cited

U.S. PATENT DOCUMENTS

| | | | | |
|---|---|---|---|---|
| 7,078,832 | B2* | 7/2006 | Inagaki | H02K 7/14 |
| | | | | 335/238 |
| 7,586,220 | B2* | 9/2009 | Roberts | H02K 1/34 |
| | | | | 290/1 R |
| 7,791,456 | B2* | 9/2010 | Miura | H02K 33/16 |
| | | | | 340/407.1 |
| 7,948,124 | B1* | 5/2011 | Waters | H02K 35/00 |
| | | | | 310/36 |
| 8,097,991 | B2* | 1/2012 | Masami | H02K 33/16 |
| | | | | 310/15 |
| 8,456,032 | B2* | 6/2013 | Hochberg | F03B 13/00 |
| | | | | 290/43 |
| 8,593,017 | B2* | 11/2013 | Stefanini | H02K 35/02 |
| | | | | 290/1 R |
| 8,629,569 | B2* | 1/2014 | Roberts | H02K 35/02 |
| | | | | 290/1 R |
| 9,461,530 | B2* | 10/2016 | Wasenczuk | H02K 35/02 |
| 9,906,109 | B2* | 2/2018 | Endo | H02K 33/16 |
| 10,170,969 | B2* | 1/2019 | Ohishi | H02K 7/1876 |
| 10,622,538 | B2* | 4/2020 | Zhang | H10N 30/802 |
| 11,031,857 | B2* | 6/2021 | Wasenczuk | H02N 2/186 |
| 11,152,843 | B2* | 10/2021 | Wasenczuk | H02K 1/34 |
| 11,418,099 | B2* | 8/2022 | Takahashi | H02K 33/16 |
| 11,658,555 | B2* | 5/2023 | Mori | H02K 33/16 |
| | | | | 310/28 |
| 11,714,490 | B2* | 8/2023 | Kim | H02P 25/032 |
| | | | | 345/173 |
| 11,831,214 | B2* | 11/2023 | Chiba | B06B 1/14 |
| 11,843,298 | B2* | 12/2023 | Ando | H02K 33/18 |
| 11,943,599 | B2* | 3/2024 | Patsouras | H04R 11/14 |
| 11,973,389 | B2* | 4/2024 | Neubauer | H02K 33/16 |
| 2003/0112993 | A1 | 6/2003 | Teshima et al. | |
| 2004/0119343 | A1* | 6/2004 | Ueda | G10K 9/22 |
| | | | | 310/12.31 |
| 2007/0182257 | A1* | 8/2007 | Miura | H04R 9/02 |
| | | | | 310/23 |
| 2008/0265692 | A1* | 10/2008 | Roberts | H02K 1/34 |
| | | | | 310/15 |
| 2010/0066182 | A1* | 3/2010 | Yamazaki | B06B 1/045 |
| | | | | 310/29 |
| 2010/0327672 | A1* | 12/2010 | Roberts | H02K 35/00 |
| | | | | 310/25 |

| | | | | |
|---|---|---|---|---|
| 2011/0133577 | A1* | 6/2011 | Lee | H02K 33/18 |
| | | | | 310/15 |
| 2011/0193426 | A1* | 8/2011 | Chung | H02K 33/16 |
| | | | | 310/25 |
| 2011/0198948 | A1* | 8/2011 | Keisuke | H02K 5/225 |
| | | | | 310/25 |
| 2011/0198949 | A1* | 8/2011 | Furuich | H02K 33/16 |
| | | | | 310/25 |
| 2011/0260559 | A1* | 10/2011 | Kanai | B06B 1/16 |
| | | | | 310/25 |
| 2012/0212097 | A1* | 8/2012 | Wasenczuk | B06B 1/04 |
| | | | | 310/216.001 |
| 2013/0033129 | A1* | 2/2013 | Hong | B06B 1/045 |
| | | | | 310/25 |
| 2013/0285479 | A1* | 10/2013 | Kinoshita | H02K 35/02 |
| | | | | 310/12.12 |
| 2013/0342032 | A1* | 12/2013 | Laurent | H02K 35/04 |
| | | | | 310/306 |
| 2014/0103751 | A1* | 4/2014 | Furukawa | H02K 35/02 |
| | | | | 310/25 |
| 2014/0132089 | A1* | 5/2014 | Jeon | H02K 33/18 |
| | | | | 310/14 |
| 2014/0265651 | A1* | 9/2014 | Kim | H02K 33/16 |
| | | | | 310/25 |
| 2015/0226197 | A1* | 8/2015 | Hahn | F04B 39/122 |
| | | | | 417/363 |
| 2015/0330449 | A1* | 11/2015 | Ribault | B23K 11/26 |
| | | | | 219/121.64 |
| 2017/0288523 | A1* | 10/2017 | Katada | H02P 25/032 |
| 2017/0366077 | A1* | 12/2017 | Oonishi | H02J 50/00 |
| 2019/0207496 | A1* | 7/2019 | Takahashi | H02K 33/02 |
| 2020/0274432 | A1* | 8/2020 | Wauke | H02K 33/06 |
| 2021/0028679 | A1* | 1/2021 | Wasenczuk | H02K 1/34 |
| 2021/0159768 | A1 | 5/2021 | Chiba | |
| 2021/0328491 | A1* | 10/2021 | Takahashi | H02K 33/16 |
| 2022/0085709 | A1* | 3/2022 | Oonishi | B06B 1/045 |
| 2022/0123639 | A1* | 4/2022 | Takahashi | H02K 33/06 |
| 2022/0123642 | A1* | 4/2022 | Takahashi | H02K 33/16 |
| 2023/0074890 | A1* | 3/2023 | Muniraju | H10N 10/13 |
| 2023/0101894 | A1* | 3/2023 | Takahashi | H02K 33/02 |
| | | | | 310/81 |
| 2023/0103219 | A1 | 3/2023 | Chiba | |
| 2023/0361662 | A1* | 11/2023 | Takahashi | B06B 1/045 |

FOREIGN PATENT DOCUMENTS

| | | |
|---|---|---|
| KR | 20110083333 | 7/2011 |
| WO | 2019194223 | 10/2019 |
| WO | 2020045470 | 3/2020 |

* cited by examiner

VIBRATION ACTUATOR WITH FRAME HAVING FIXING AND DAMPING PORTIONS HOLDING LEAF SPRING

CROSS-REFERENCE TO RELATED APPLICATION

This application is a 371 application of the International PCT application serial no. PCT/JP2022/011995, filed on Mar. 16, 2022, which claims the priority benefits of Japan Patent Application No. 2021-057490, filed on Mar. 30, 2021. The entirety of each of the above-mentioned patent applications is hereby incorporated by reference herein and made a part of this specification.

FIELD OF INVENTION

The present disclosure relates to vibration actuators, and particularly relates to vibration actuators supporting a mover by a lead spring.

BACKGROUND

Conventionally, a notification method by vibration using vibration actuators (or vibration motors) is used as a method to notify people of calls and alarms in communication devices such as mobile phones. And in recent years, vibration actuators are used in the fields of movies, games, and VR (Virtual Reality) as ways to produce effects in action scenes and to provide feedbacks to players, enhancing the reality by stimulating human sense of touch though vibration.

The vibration actuator may use a method in which vibration due to inertial force is produced by rotating an eccentric weight using a motor. However, since the method using the rotary motor produces vibration by the inertial force of the eccentric weight, there is a disadvantage of slow response until the eccentric weight starts rotating and produces vibration, which diminishes the reality.

Accordingly, for example, a voice-coil type actuator as indicated in the Patent Document 1 may be employed as the actuator to obtain more realistic sense of touch. In said vibration actuator, a mover with a magnet is arranged inside a cylindrical casing, a coil fixed to the casing is arranged around the mover, and power is conducted through the coil to reciprocate the mover inside the casing. In this case, to reciprocally support the mover relative to the casing, disc-shaped leaf spring with multiple arms is used. Furthermore, in the invention of the Patent Document 1, a damping member to control the vibration characteristic is provided in the leaf spring.

PRIOR ART DOCUMENT

Patent Document

Patent Document 1: WO 2019-194223

SUMMARY OF INVENTION

Problems to be Solved by Invention

As indicated in the Patent Document 1, when the damping member is provided in the lead spring, a damping member with a shape along a shape of the lead spring is formed and is adhered and fixed by adhesive on the lead spring so that the leaf spring and the damping member would not be displaced with each other. That is, if the shape and fixation between the leaf spring and the damping member are displaced, the damping member protruding from the arm of the leaf spring to a plane orthogonal to the vibration-axis direction acts a resistance, and gives adverse effect to the amplitude of the mover. Therefore, the damping member must be precisely formed along the arm of the leaf spring, and at the same time, the leaf spring and the damping member must be accurately aligned when fixing the lead spring and the damping member.

However, according to the conventional technology, the production cost of the damping member is high due to the formation of the damping member along the shape of the arm of the leaf spring. Furthermore, the assembly process is complex due to accurate alignment and adhesion of the lead spring and the damping member.

Furthermore, in the vibration actuator supporting the mover by the leaf spring, there is a disadvantage that when the damping member is fixed on the inner circumference of the leaf spring, the amplitude stress of the mover concentrates to the damping member, leading to deterioration of acceleration performance and durability of the vibration actuator due to damage and peeling off of the damping member.

Moreover, although the mover is supported by the casing at the fixed side via the leaf spring, if there is variation in the fixing position of the casing and the leaf spring or the leaf spring and the damping member, the positional relationship among the casing, the leaf spring, and the mover becomes different for each product, which makes the vibration characteristic of the leaf spring non-uniform. In particular, when the vibration axis is used as reference, if there is positional displacement and misalignment between the casing and the leaf spring in the vibration-axis direction, the pressure applied to the leaf spring in the axial direction becomes uneven, producing variation in the degrees of deformation of the leaf spring. Furthermore, if there is displacement in the fixing position of the leaf spring relative to the casing in the circumferential direction, variation is produced in the contact position of the damping member relative to the leaf spring, leading to a problem that the appropriate vibration characteristic of the leaf spring cannot be obtained regardless of the damping member.

The present disclosure is proposed to address the above-described problem. The objective of the present disclosure is to facilitate assembling of the leaf spring and the damping member and to provide a vibration actuator with excellent vibration characteristic.

Means to Solve the Problem

A vibration actuator of the present disclosure has the following configuration.
(1) casing;
(2) a coil provided in the casing;
(3) a mover vibrating along a vibration-axis direction of the casing;
(4) a leaf spring in which an inner circumferential portion thereof is fixed to a mover;
(5) a frame fixing the leaf spring to the casing;
(6) the frame includes a fixing portion provided in an outer circumferential portion of the leaf spring and a damping portion provided in a vibrating portion of the leaf spring.

In the present disclosure, following configuration may be employed.

(1) the frame and the leaf spring are overmolded;

(2) an engaging portion engaging to an engaged portion at a casing side is provided to the fixing portion;

(3) the damping portion is formed by a protrusion protruding inward than an inner diameter of the casing, and a plurality of the protrusions is provided;

(4) the leaf spring includes an annular inner circumferential portion to which the mover is attached, an outer circumferential portion attached to the damping portion, and a plurality of spiral arms connecting the inner circumferential portion and the outer circumferential portion;

(5) the damping portion is fixed to the arm by molding;

(6) the arm has a through hole or a notch;

(7) the damping portion covers the leaf spring;

(8) the frame includes the engaging portion from which a part of the leaf spring exposes, and the exposed portion of the leaf spring abuts with a positioning portion of the casing in the axial direction;

(9) a surface or a back surface of the frame is knurled.

Effect of Invention

According to the present disclosure, the assembling of the leaf spring and the damping member is facilitated, and a vibration actuator with excellent vibration characteristic can be provided.

EMBODIMENTS

1. First Embodiment

1-1. Configuration

Figure 1:
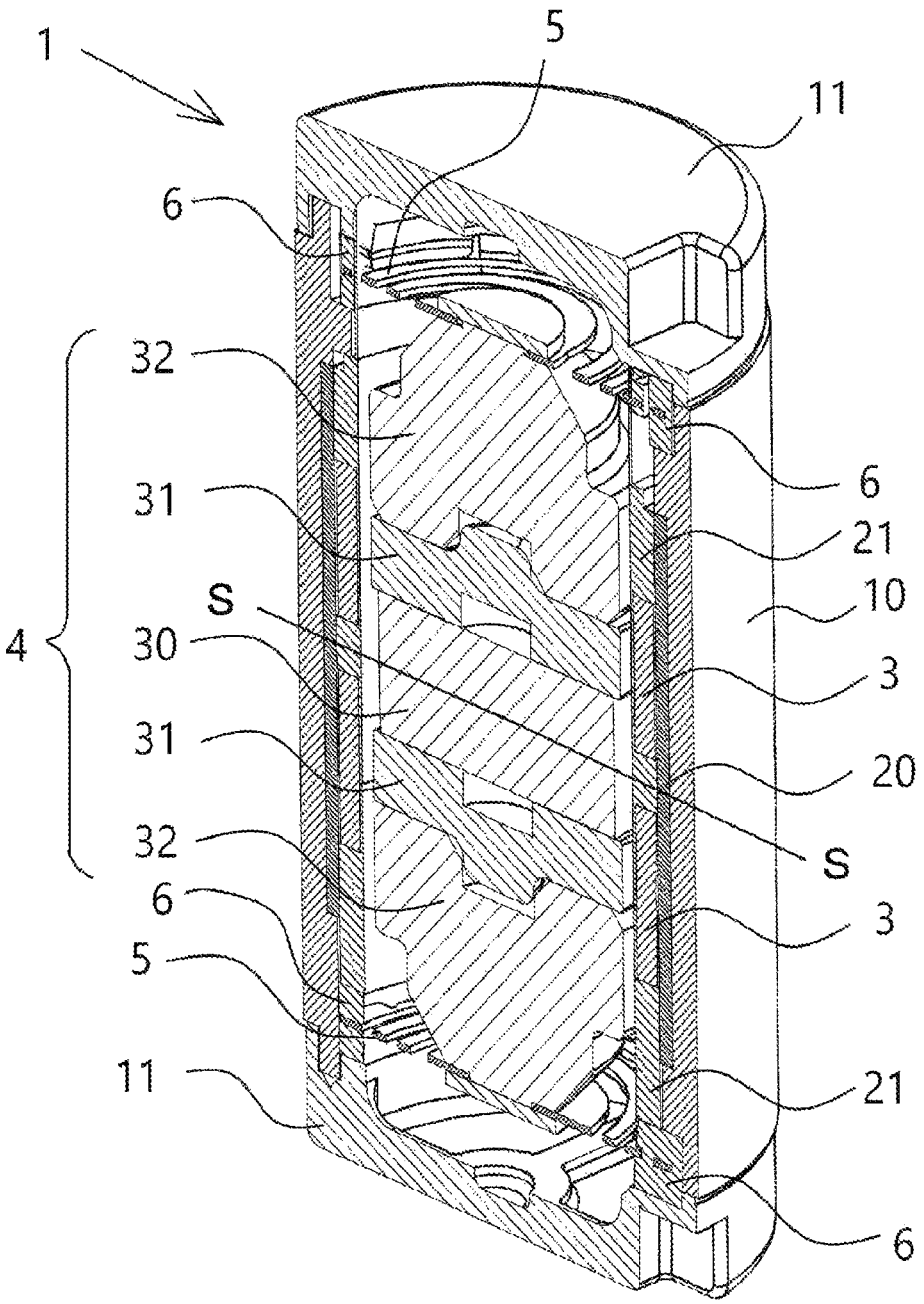
FIG. 1 is a cross-sectional view illustrating an entire configuration of the first embodiment along the vibration-axis direction.

Hereinafter, a vibration actuator 1 of the first embodiment is described using FIGS. 1 and 2. A vibration actuator 1 of the present embodiment includes components of the same shape with a symmetrical plane (S in FIG. 2) perpendicular to the central axis at one half in the vibration-axis-O direction as a boundary. Therefore, only configuration of each component at one side in the symmetrical components is described, and the description for the other will be omitted by adding the same signs unless required otherwise.

(1) Casing and Coil

The vibration actuator 1 mainly includes a cylindrical casing 2 forming an outer shell, a coil 3 provided inside the casing 2, a mover 4 vibrating along the vibration axis O of the casing 2, a leaf spring 5 in which an inner circumferential portion thereof is fixed to the mover 4, and a frame 6 fixing the leaf spring 4 to the casing 2.

Figure 9:
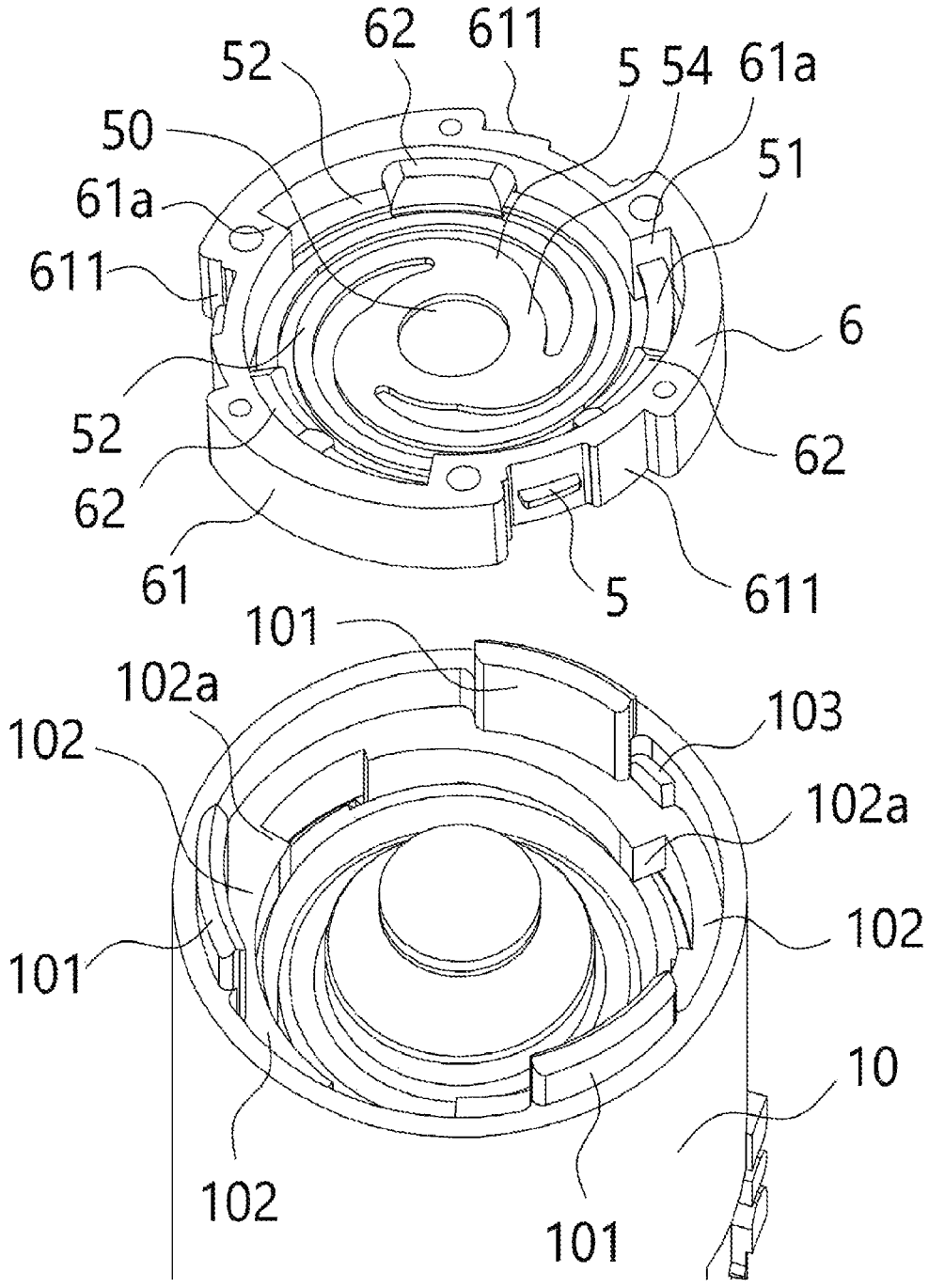
FIG. 9 is an exploded perspective view illustrating a structure to fix a leaf spring and a frame to a casing body in the first embodiment.

The casing 2 includes a cylindrical casing body 10, and a cover casing 11 closing openings at both end of the casing body 10. As illustrated in FIG. 9, a flange 102 protruding inward in the radial direction of the casing body 10 is provided on the end surface of the cylindrical casing body 10. The flange 102 includes a spiral inner edge with three steps 102a to match the shape of the leaf spring 5 with spiral arms. Three engaging claws 101 extending from an opened end of the casing body 10 in the vibration-axis-O direction is provided on a surface of the flange 102 at intervals of 120 degrees. Bases of three engaging claws 101 protrude inward than an edge of the opening of the casing body 10 and is an engaged portion to position the frame 6 in the circumferential direction.

As illustrated in FIG. 9, a positioning portion 103 for the frame 6 in the axial direction is provided on the surface of the flange 102. In the present embodiment, the positioning member 103 is close to the engaging claw 101 and protrudes from the surface of the flange 102. Furthermore, a surface of the positioning member 103 is a portion abutting with a bottom of the leaf spring 5.

Figure 3:
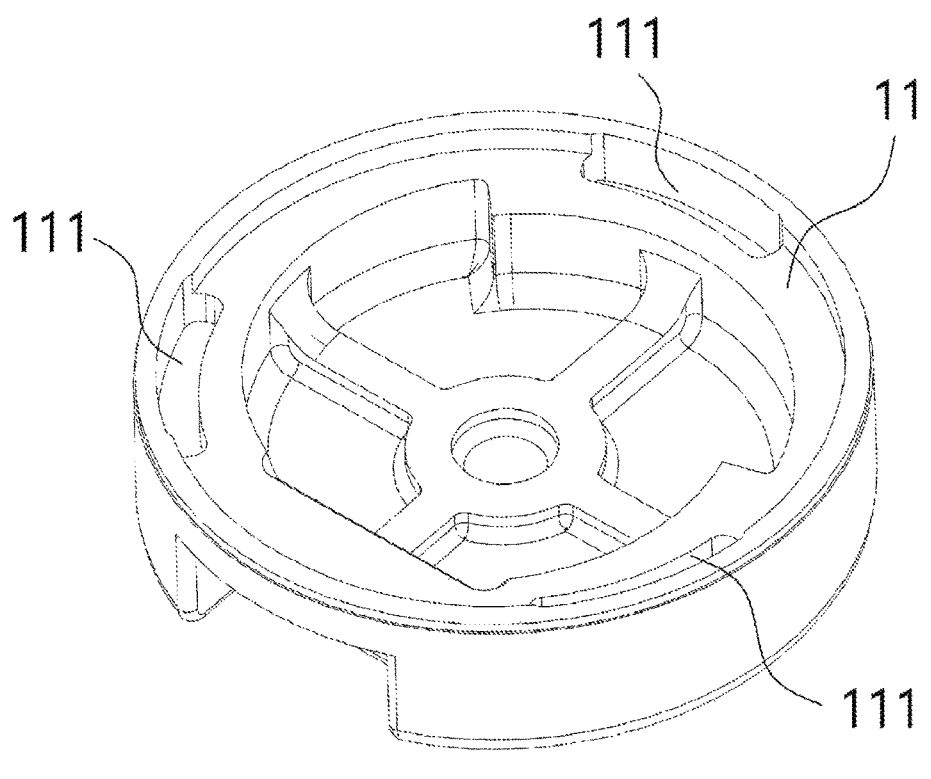
FIG. 3 is a perspective view of the inside of a cover casing view of the first embodiment.

As illustrated in FIG. 3, three engaging holes are provided in the cover casing 11 at the outer circumferential side, and the cover casing 11 and the casing body 10 are fixed to each other by engaging three engaging claws provided and protruding from the opening of the casing body 10 to three engaging holes 111.

In the present embodiment, the casing body 10 and cover casing 11 are formed of resin material such as ABS, however, the material is not limited to resin material.

Figure 4:
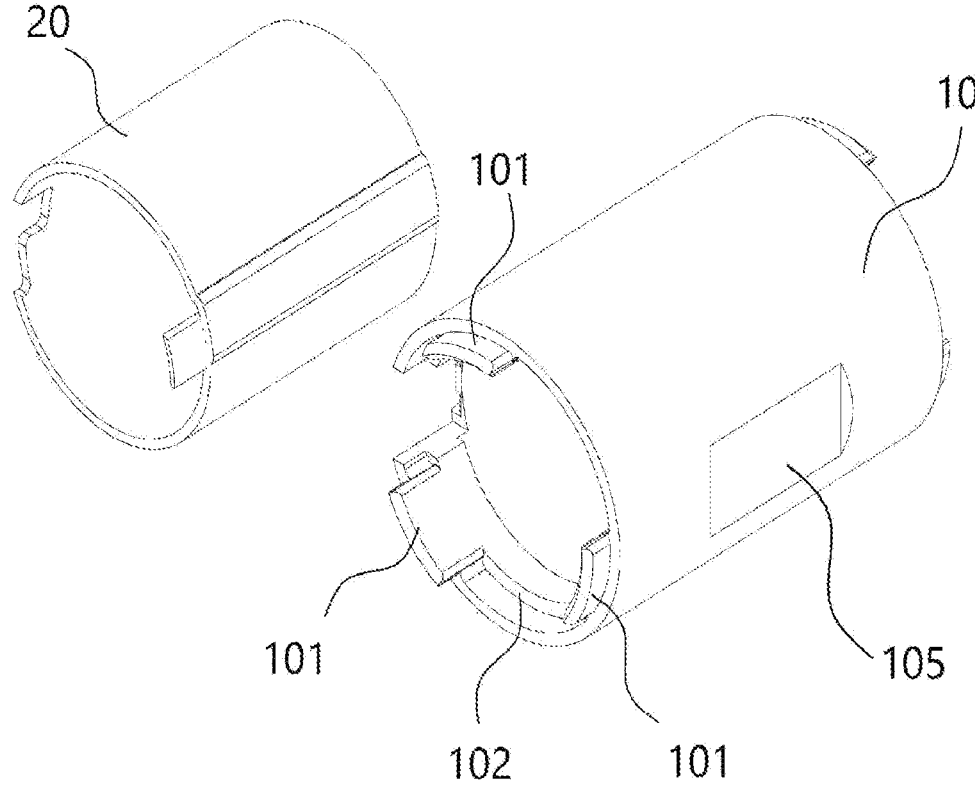
FIG. 4 is an exploded perspective view of a casing body and a yoke of the first embodiment.

The coil 3 and a yoke 20 are inserted into the casing 2. As illustrated in FIG. 4, the casing body includes the yoke 20 formed of cylindrical soft magnetic material formed along the inner circumference of the casing body 10. The coil 3 is attached to the inner circumference of the yoke 20 and is electrically insulated from the yoke 21.

Figure 5:
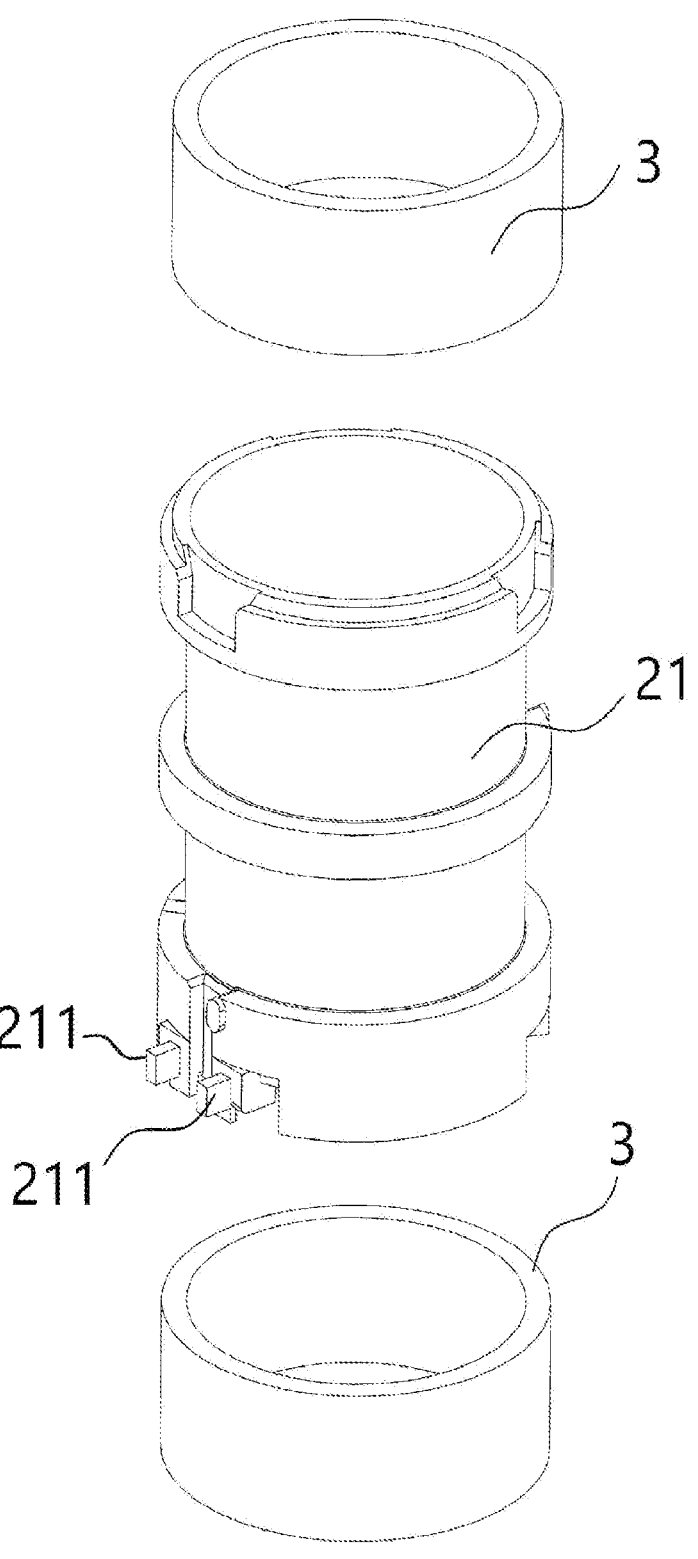
FIG. 5 is an exploded perspective view of a coil and a bobbin of the first embodiment.

As illustrated in FIG. 5, the coil 3 is wound along a concaved portion of a bobbin 21 at the outer circumferential side and is arranged to have predetermined distance from the outer circumference of the mover 4. The bobbin 21 includes an inner wall in the inner circumference of the casing body 10 so as to cover the surface of the coil 3 at the mover-4 side, and a gap is provided between the inner wall of the bobbin 21 and an outer circumferential surface of the mover 4, to prevent the mover 4 and the coil 3 from contacting with each other when they vibrate. The coil 3 can generate magnetic field by power conducted from a terminal 106. The coil 3 may be temporarily fixed to the yoke 20 and the bobbin 21 such as by adhesive at the time of assembling.

(2) Mover

Figure 6:
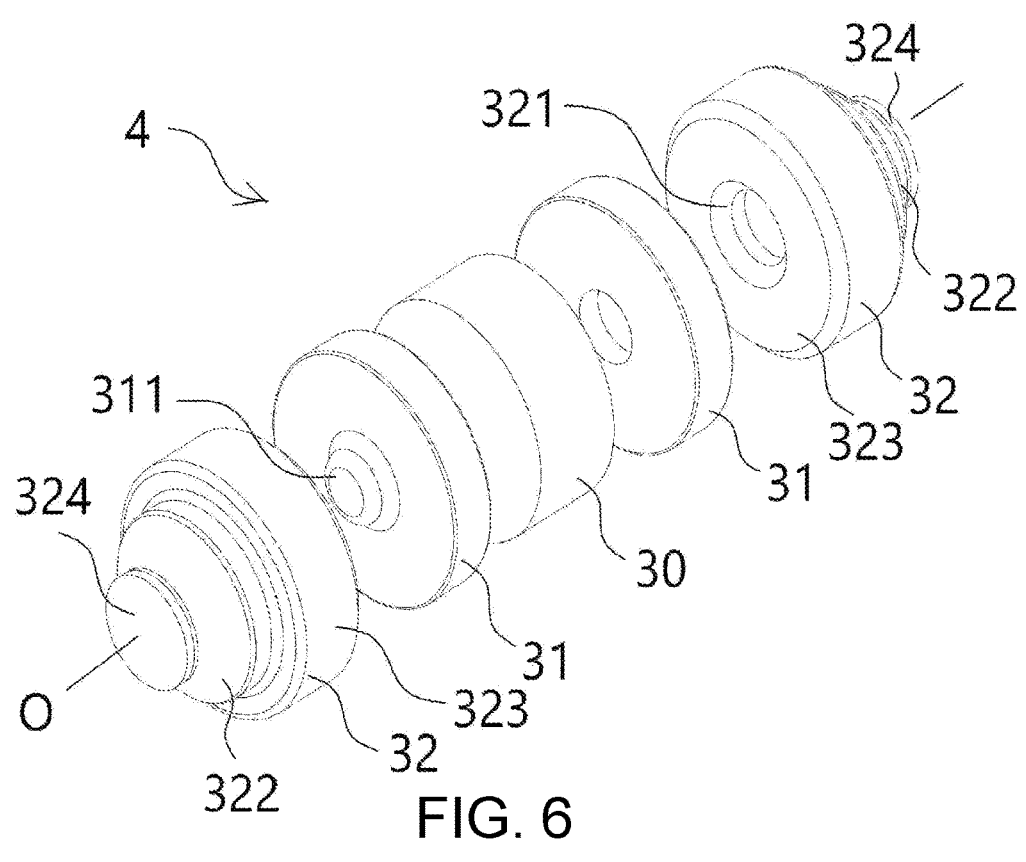
FIG. 6 is an exploded perspective view of a mover of the first embodiment.

The mover 4 is arranged inside the casing body 10 so as to vibrate along the vibration-axis-O direction that is the central axial direction of the cylindrical casing 2. As illustrated in FIG. 6, the mover 4 includes a disc-shaped magnet 30, a disc-shaped pole piece 31 arranged on a surface of the magnet 30, and a weight 32 arranged on a surface of the pole piece 31.

The magnetization direction of the magnet 30 is in the vibration-axis-O direction. The pole piece 31 is formed of soft magnetic material and is attached to the magnet 30 such as by magnetic attraction of the magnet 30 and adhesive. As illustrated in FIG. 6, a convex portion 311 is formed at the central portion of the pole piece 31 along the vibration-axis-O direction, and a concaved portion 321 is formed at the central portion of the corresponding weight 32 along the vibration-axial-O direction. The pole piece 31 and the weight 32 are integrated by engaging the convex portion 311 of the pole piece 31 and the concaved portion 321 of the weight 32. Note that this integration does not need the engagement of the convex portion 311 of the pole piece 31 and the concaved portion 321 of the weight 32 without a gap, but includes the loose engagement with a gap between the both, and the any degrees of engagement may be employed. The integration of the magnet 30, the pole piece 31, and the weight 32 is not limited to attachment using magnetic attraction and adhesive, and they may be integrated by fixation using mechanical method such as press-fitting and screwing or other methods.

Figure 2:
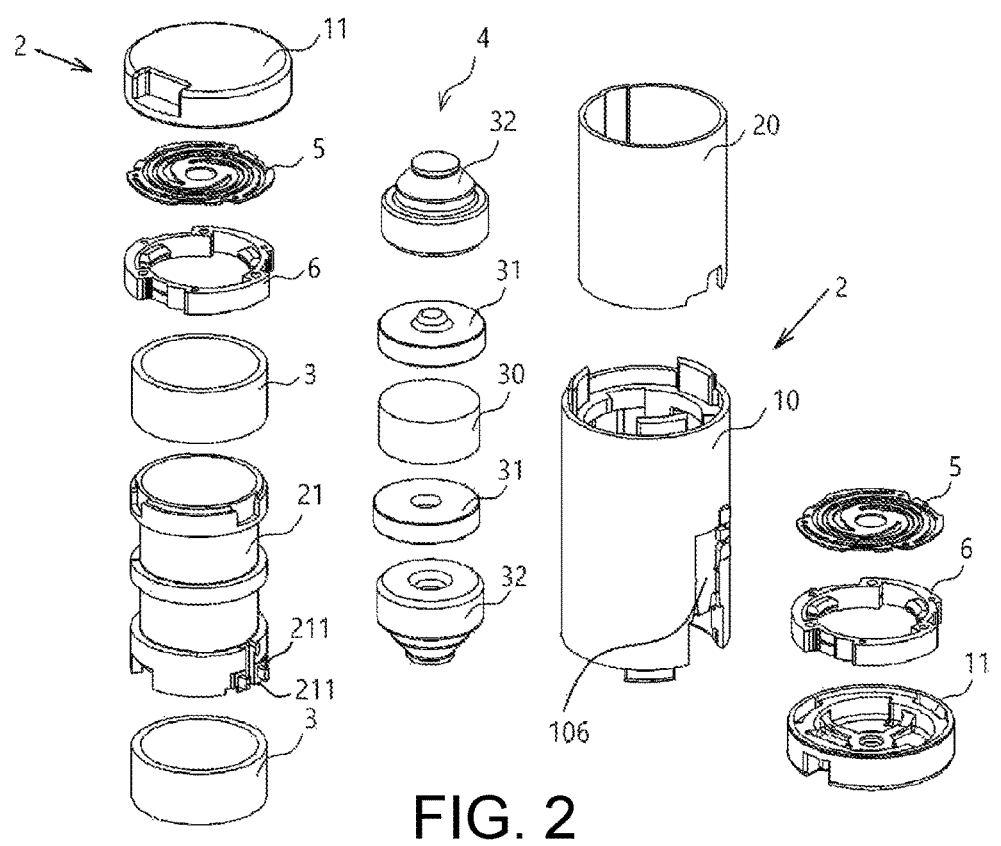
FIG. 2 is an exploded perspective view illustrating an entire configuration of the first embodiment.

As illustrated in FIG. 1, in the mover 4, the outer shape of the magnet 30 is radially smaller than the outer shapes of the pole piece 31 and the weight 32. That is, the outer circumference of the pole piece 31 and the weight 32 is located at the outermost circumference and is the closest to the inner circumference of the bobbin 21.

As illustrated in FIG. 6, the weight 32 is formed of non-magnetic material, and includes a bell-shaped conical base 322 extending in vibration-axis-O direction and a disc-shaped bottom 323 spreading from a bottom of the conical base 322 in the outer circumferential direction.

As illustrated in FIG. 6, a central shaft 324 protruding in the vibration-axis-O direction is provided at a center of a tip of the conical base 322 in the weight 32. For example, the central axis 324 of the weight 32 is circular and is inserted into a shaft hole 50 of the leaf spring 5 to fix the leaf spring 5 and the weight 32.

(3) Leaf Spring

The leaf spring 5 is formed by one or multiple metal leaf springs, and for example in the present embodiment, a processed thin plate of stainless steel is used. Material of the leaf spring 5 is not limited to metal and may be composite material containing resin and fiber. Furthermore, the material of the leaf spring 5 is desirably material with excellent durability and flexibility.

Figure 7:
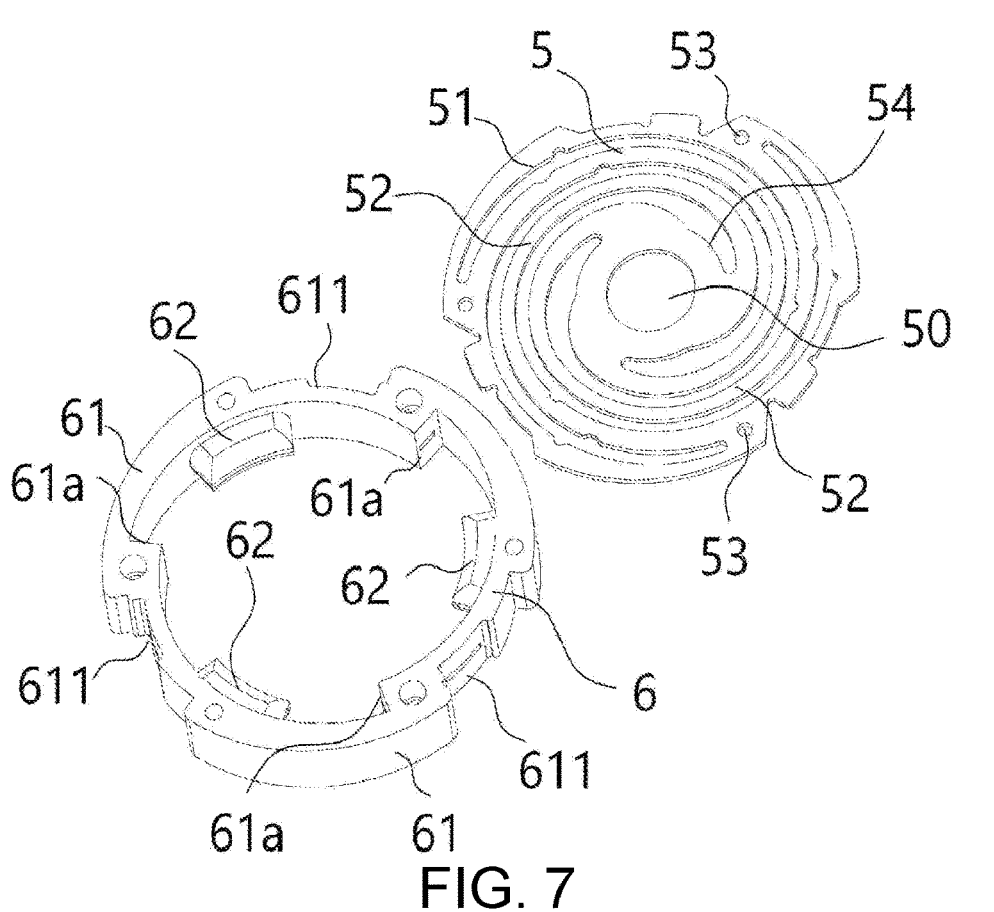
FIG. 7 is an exploded perspective view of a leaf spring and a frame of the first embodiment.

As illustrated in FIG. 7, the circular shaft hole 50 fit to the central shaft 324 of the weight 32 is provided at the center in the inner circumferential portion of the leaf spring 5. The leaf spring 5 and the weight 32 are connected using this shaft hole 50. The central shaft 324 protruding from the surface of the leaf spring 5 is heated or pressurized and crushed by a jig to superposition and swage the weight 32 and the lead spring 5. The fixing method of the leaf spring 5 and the weight 32 is not limited to swaging, and they may be fixed (connected) by other methods such as screwing or adhesion if they include the circular central axis 324 and the shaft hole 50.

As illustrated in FIG. 7, the leaf spring 5 includes the annular inner circumferential portion 54 to which the mover 4 is attached, the outer circumferential portion 51 attached to a damping portion 62, and a plurality of spiral arms 52 connecting the inner circumferential portion 54 and the outer circumferential portion 51. The arms 52 are provided around the vibration axis O at an equal interval of 120 degrees. An outer circumferential portion 51 of each arm 52 is connected to the frame 6 connecting the leaf spring 5 to the casing body 10. Three through holes 53 are provided in the outer circumferential portion 51.

(4) Frame

Figure 8:
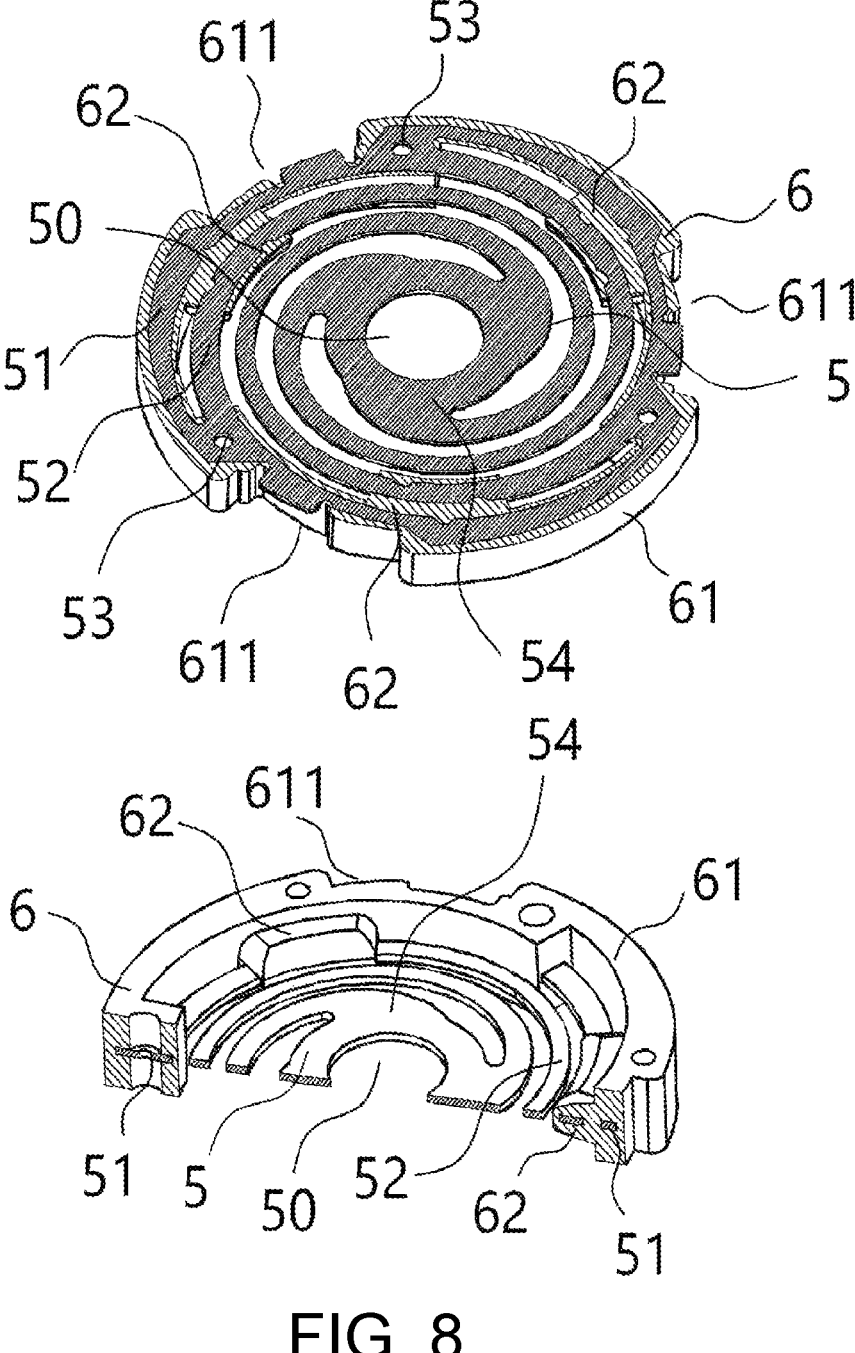
FIG. 8 is a horizontal and vertical cross-sectional view of a leaf spring and a frame view of the first embodiment.

As illustrated in FIGS. 7 to 9, the frame 6 includes a fixing portion 61 fixing the outer circumferential portion 51 of the leaf spring 5 to the casing 2 and the damping portion 62 provided in a vibrating portion of the leaf spring 5. The fixing portion 61 has a shape along the inner circumference of the casing body 10 and is substantially circular. A concaved portion 611 which is concaved toward the inner circumferential side is provided in the outer circumferential portion of the fixing portion. As illustrated in FIG. 9, this concaved portion 611 forms an engaging portion engaging with an engaged portion provided in the bases of three engaging claws 101 provided in the casing body 10 and positioning the frame 6 in the circumferential direction. The shapes of the engaging portion and the engaged portion are not limited to the present embodiment, and the numbers of the engaging portion and the engaged portion may be increased or decreased as appropriate.

Three steps 61a are provided at the inner circumferential side of the fixing portion 61 to match the shape of the leaf spring 5 with the spiral arms 52 like the flange 102 of the casing body 10, and a part of the outer circumferential portion 51 of the leaf spring 5 is exposed from the step 61a. This exposed portion of the leaf spring 5 is "the exposed portion" in claims. In detail, as illustrated in FIG. 9, the exposed portion which is a part of the outer circumferential portion 51 of the leaf spring 5 being exposed is provided in the concaved portion 611 provided in the outer circumference of the frame 6. This exposed portion provided in the concaved portion abuts with the positioning portion 103 in the axial direction provided in the casing body 10.

As illustrated in FIGS. 7 to 9, the damping portion 62 controlling the vibration characteristic is formed by a protrusion protruding inward than the inner diameter of the casing body 10. The shape, position, and number of the protrusion is not limited if the protrusion protrudes inward than the inner diameter of the casing body 10. In the present embodiment, three damping portions 62 are provided at equivalent intervals to match the number of the arms of the leaf spring 5. The width and height of the damping portion 62 is in a region that can give mechanical resistance to the leaf spring 5 and that can obtain the most suitable vibration characteristic. Note that the fixing portion 61 and the damping portion 62 are integrally formed or separately formed by molding.

As illustrated in FIG. 8, the frame 6 and the leaf spring 5 are integrated by molding. That is, by placing the leaf spring 5 in a mold and pouring resin into the mold, the frame 6 is overmolded on both top and bottom surface of the leaf spring 5, so that the frame 6 and the leaf spring 5 are molded integrally in a state the leaf spring 5 is sandwiched by an upper portion and lower portion of the frame 6.

The damping portion 62 is fixed to the arm 52 of the leaf spring 5 by molding. The dimension and shape of the damping portion 62, such as thickness, protruding amount from the frame 6, length in the circumferential direction, and numbers, are set so that the leaf spring 5 expresses the desired vibration characteristic. For example, an opening reaching the surface of the leaf spring 5 may be provided in the damping portion 62, an opening penetrating a gap between the arms 52 of the leaf spring 5 and reaching the back surface of the damping portion 62 from the surface of the damping portion 62 may be provided, or a plurality of bracket-shape members protruding from the inner circumference of the frame 6 toward the center of the frame 6 may be used.

In the present embodiment, a tip of the damping portion 62 enters a groove between the arms 52 of the leaf spring 5 and sandwiches and holds the surface and back surface of the arm 52 to fix the arm 52, however, the configuration is not limited thereto, and the tip of the damping portion 62 may only contact with either of the surface and back surface of the arm 52. Note that when sandwiching and holding the surface and back surface of the arm 52 by the damping portion 62, the adhesion of the damping portion 62 the leaf spring 5 can be improved by providing the through hole 53 or a notch in the arm 52 so that resin forming the damping portion 62 can smoothly flow in from the surface of the arm 52 to the back surface of the arm 52.

The frame 6 has at least one of polyethylene and elastomer. The elastomer may be a thermoplastic polyurethane elastomer (TPU), however, it is not limited thereto. The leaf spring 5 is damped such as by elastic deformation of the frame 6, particularly shear deformation of the polyethylene and bending deformation of the elastomer. The fixing portion 61 and the damping portion 62 may be formed by the same resin material, however, the fixing portion 61 may be formed of hard resin material with little elastic deformation and the damping portion 62 may be formed of elastic material such as elastomer. Furthermore, metal or resin reinforcement member other than the leaf spring 5 may be molded around the frame 6.

The leaf spring 5 with such configuration can be elastically deformed within a predetermined range in the vibration-axis-O direction and the vertical radial direction S orthogonal to the vibration-axis-O direction. Note that this predetermined range corresponds to the amplitude range of the mover 4 when the vibration actuator 1 is normally used. Therefore, the predetermined range is a range in which at least the leaf spring 5 does not contact the casing 2 and which does not exceed the elastic deformation limit of the leaf spring 5. Since the leaf spring 5 has three spiral arms 52, when the leaf spring 5 deforms the most, the cross-section thereof become a mountain-shape in which the center in the vibration-axis-O direction protrudes the most, and the fixed portion of the leaf spring 5 and the frame 6, that is, the outer circumference of the leaf spring 5 deforms the least. Therefore, even though there are the frame 6 and the respective steps 61a and 102a in the flange 102 of the casing body 10, and the shape of the inner circumference is spiral, the steps 61a and 102a protruding toward the center (in the vibration-axis-O direction) of the casing 2 does not contact with the leaf spring 5 when the leaf spring 5 deforms.

(5) Terminal

Figure 10:
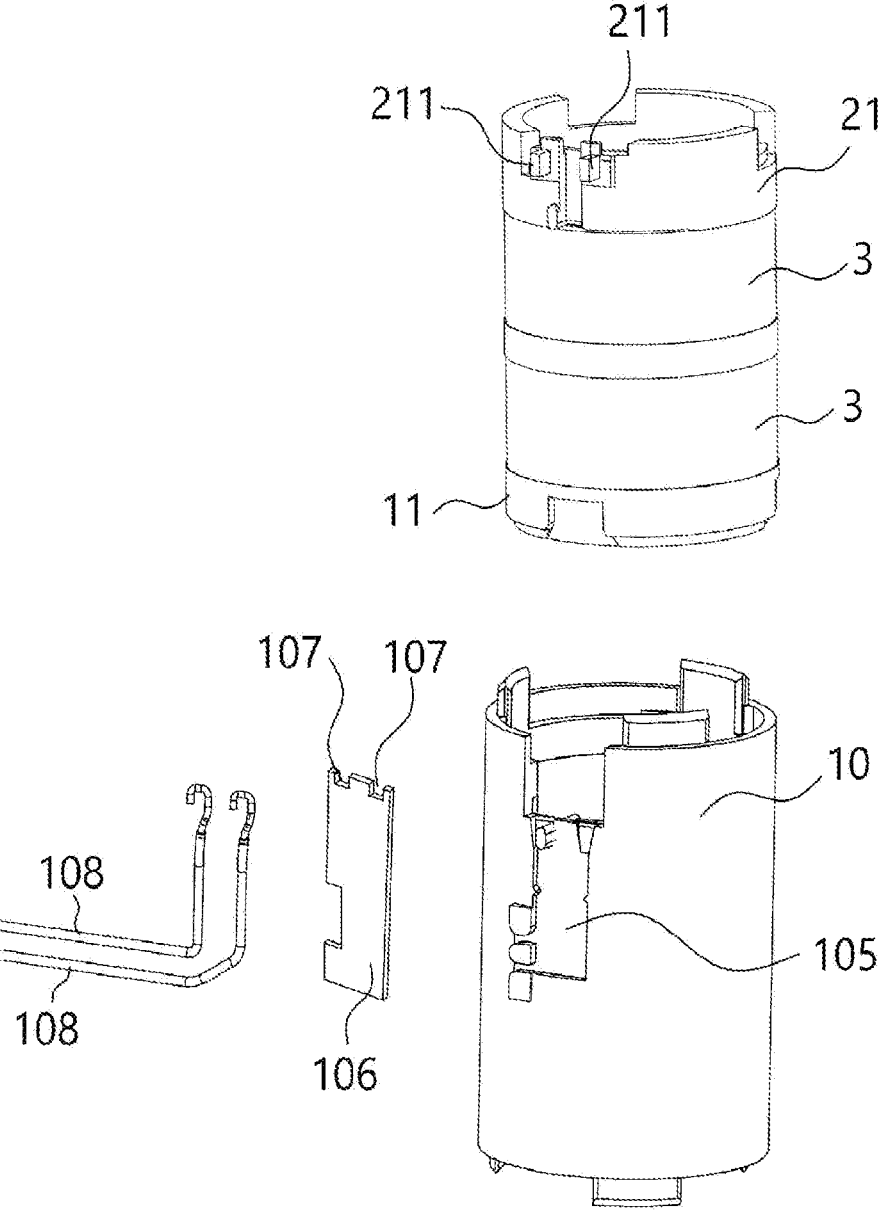
FIG. 10 is an exploded perspective view illustrating a terminal of the first embodiment to which a coil, a bobbin, and a casing body is arranged.

As illustrated in FIG. 10, in the present embodiment, a terminal 211 connecting lead wire of each coil 3 is integrally formed to the bobbin 21 by molding. Meanwhile, a terminal fixing portion 105 is provided in the outer circumferential surface of the casing body 10 to match the position of the terminal 211, and a terminal 105 formed by a printed circuit board is fixed to the fixing portion 105. The terminal 106 and the fixing portion 105 may be fixed by molding the terminal 106 to the casing body 10, or by ultrasonic welding. A concaved portion 107 for a connector to which the terminal 211 is fit is provided to the terminal 106, and a power supply wire 108 for supplying power to the vibration actuator 1 is connected to the terminal 106 by soldering, etc. Note that it is not necessary to provide the terminal 106 formed by the printed circuit board, and the power supply wire 108 and the terminal 211 connecting the lead wire of each coil 3 may be directly connected.

1-2. Action of Embodiment (1) Operation of Vibration Actuator 1

As illustrated in FIG. 1, in the vibration actuator 1 configured as described above, the mover 4 supported by the lead spring 5 is located at the center in the vibration-axis-O direction when the coil 3 is not conducted.

When to vibrate the mover 4, alternating current is conducted to the coil 3 via the terminal 106 in the direction that alternately generates magnetic field with opposite polarity. That is, the same pole is generated in the adjacent portions of the coil 3. For example, in the case of the polarity, thrust toward one side in the vibration-axis-O direction is produced at the mover 4, and when the current flowing in the coil 3 is revered, thrust toward the other side in the vibration-axis-O direction is produced at the mover 4. Accordingly, when the alternating current is conducted in the coil 3, the mover 4 vibrates along the vibration-axis-O direction while receiving bias force by the leaf spring 5 from both sides. The leaf spring 5 is damped as by the elastic deformation of the frame 6, particularly, shear deformation of the polyethylene and bending deformation of the elastomer.

The thrust produced at the mover 4 basically follows thrust applied based on the Fleming's left-hand rule. In the present embodiment, since two coils 3 arranged symmetrically is fixed to the casing 2, thrust as reaction force to force generated at two coils 3 is produced at the mover 4 attached to the magnet 30, etc.

(2) Assembly

In the vibration actuator 1 of the present embodiment with such a configuration, the bobbin 21 to which the coil 3 is attached is incorporated inside the casing body 10 integrated to the yoke 20, and the mover 4 is inserted into the bobbin 21. In this case, the leaf spring 5 molded to the frame 6 is fixed to the central shaft 324 of the weight 32 of the mover 4 by method such as swaging, and the mover 4 fixed to the leaf spring 5 is inserted into the bobbin 21.

The fixing portion 61 of the frame 6 is overlaid on the flange 102 of the casing body so that the engaging claw 101 of the casing body 10 is fit inside the concaved portion 611 of the frame 6 to fit the frame 6 inside the casing body 10. Accordingly, the concaved portion 611 and the basis of the engaging claw become the engaging portion and the engaged portion that engage with each other, so that the frame 6 is positioned in the circumferential direction. At the same time, the leaf spring 5 exposed from the concaved portion 611 abuts with the positioning portion 103 provided in the flange 102, so that the leaf spring 5 is positioned in the axial direction.

Then, the cover casing 11 is placed to cover the opening of the casing body 10 and is pressurized so that three engaging claws 101 are fit in three engaging holes 111, and the cover casing 11 and the casing body 10 are welded ultrasonically to fix the both. In this case, the adhesion between the frame 6 and the cover casing 11 and between the frame 6 and the casing body 10 is ensured by contacting a ultrasonic horn to the outside of the cover casing 11 and welding three claws 101 or the entire circumference of the fixing portion 61 of the frame 6 using vibration heat.

1-3. Effect of Embodiment (1) In the vibration actuator 1 in the present embodiment, the leaf spring 5 and the frame 6 including the fixing portion 61 and the damping portion 62 are provided in advance. Therefore, the work to temporarily fix the leaf spring 5 to the casing body 10 is unnecessary, and said three members can be assembled to the casing 2 only by fixing the frame 6 to the casing body 10. Thus, the assembly work is facilitated, and the work efficiency is improved.

(2) In the vibration actuator 1 in the present embodiment, the frame 6 and the leaf spring 5 are integrated by molding. Therefore, the positioning of the leaf spring 5 to the frame 6 and the positioning of the damping portion 62 to the leaf spring 5 can be accurately and easily performed only by setting and molding the leaf spring 5 in the mold. Furthermore, the damping material can be directly and strongly adhered to the leaf spring 5, so that the damage and peeling off of the damping material can be prevented.

(3) In the vibration actuator 1 in the present embodiment, the fixing portion 61 of the frame 6 is formed toward the inner circumferential side, and the concaved portion 611 engaging the base of the engaging claw 101 of the casing body 10 is provided. In the present embodiment, since the leaf spring 5 and the frame 6 including the damping portion 62 are formed, the leaf spring 5 and the frame 6 including the damping portion 62 can be assembled to the casing body 10 at the same time by engaging the engaged portion of the casing body 10 and the concaved portion 611 provided in the frame 6. Therefore, the casing body 10 and the frame 6 can be positioned accurately and easily, and the assembly work can be facilitated.

(4) In the vibration actuator 1 in the present embodiment, the damping portion 62 protrudes inward than the inner diameter of the casing body 10, and the plurality of the damping portion 62 is provided at equal interval. Therefore, by adjusting the width and height of the damping portion 62, the damping region adapted to the size, weight, and material of each member can be adjusted easily. Furthermore, by providing the damping portion 62 at equal intervals, the stable damping performance can be achieved.

(5) In the vibration actuator 1 in the present embodiment, the resin of the frame 6 is overmolded on the arm 52 of the leaf spring 5 to fix the outer circumferential portion 51 of the lead spring 5 to the damping portion 62. Therefore, the mechanical resistance of the mover 4 can be obtained by utilizing the loss of the resin material, and the amplitude at the maximum acceleration frequency can be suppressed. Furthermore, the sharpness of the resonance peak can be suppressed, and the change in the acceleration along the change in the resonance frequency can be suppressed. As a result, the damage and peeling off of the damping material can be prevented, and the durability of the vibration actuator 1 can be improved.

(6) The vibration actuator 1 in the present embodiment includes the concaved portion 611 from which the part of the leaf spring 5 exposes in the frame 6, and the surface of the leaf spring 5 abuts with the positioning portion 103 of the casing body 10 in the axial direction. Therefore, at the time of the positioning in the axial direction, the casing body 10, and the leaf spring 5 and the frame 6 can be positioned accurately with the surface of the leaf spring 5 as a basis.

(7) In the vibration actuator 1 in the present embodiment, the frame 6 is formed by polyethylene and elastomer. Therefore, the leaf spring 5 is fixed to the casing body 10 as the fixing portion 61 of the frame 6, while in the damping portion 62, the leaf spring 5 can be damped such as by the shear deformation of the polyethylene and the bending deformation of the elastomer. Note that the frame 6 may not be formed by polyethylene and elastomer, and similar material may be used.

(8) In the present embodiment, since the terminal 211 connecting the lead wire of respective coils 3 to the bobbin 21 is provided, the work to connect the lead wire from the coil 3 to the terminal 106 is facilitated. In particular, in the small vibration actuator 1, although the lead wire of the coil 3 is thinner than the metal bar forming the terminal 211 and must be handled carefully, and is prone to poor connection and disconnection, such problems can be addressed by connecting the coil 3 and the terminal 106 via the terminal 211.

2. Other Embodiment

As described above, although several embodiments of the present disclosure are described, the embodiments are not intended to limit the scope pf claims, and as cited below, the embodiments can be implemented by various forms without departing from the abstract of the invention, and various omission, replacement, and modification may be made. Furthermore, these embodiments, combination, and modification thereof are included in the scope and abstract of the invention, and are included in the invention described in the scope of the claims. In below, example embodiments included in present disclosure will be described.

(1) For example, in the above embodiment, the frame 6 and the leaf spring 5 are integrated by molding, however, the frame 6 and the leaf spring 5 may be integrated by joining or fitting, etc. Furthermore, the fixing portion 61 and the damping portion 62 of frame 6 may not be formed by the same material, and the fixing portion 61 and the damping portion 62 may be integrated after they are formed by different material. Furthermore, the upper portion and lower portion of the frame 6 sandwiching and holding the leaf spring 5 may be formed by same or different material.

(2) The convex portion, the concaved portion, and the notch may be provided in either of the engaged portion provided in the fixing portion of the frame 6 and the engaged portion provided in the casing body 10 if both is engaged and fixed with each other. Furthermore, although the concaved portion 611 is the engaging portion and is also the exposed portion of the leaf spring 5 in the illustrated embodiment, the engaging portion positioning the leaf spring 5 and the frame 6 in the circumferential direction and the exposed portion of the leaf spring 5 positioning the leaf spring 5 and the frame in the axial direction may be separately provided.

(3) The engaging hole may be provided in the casing body 10 and the engaging claw may be provided in the cover casing 11, instead of providing the engaging claw 101 in the casing body 10 and providing the engaging hole 111 in the cover casing 11.

(4) Although three arms 52 are formed in the leaf spring 5 and the number of the damping portion 62 is three, the numbers are not limited.

(5) Although the casing 2 is cylindrical and the mover 4 is substantially pillar-shaped in the above embodiment, the shapes of the casing 2 and the mover 4 are not limited thereto and may be polygonal or other shape.

(6) In the present embodiment, the leaf spring 5 supporting the mover 4 includes the spiral arms 52, however, other leaf spring may be used. For example, leaf spring with irregular spiral in which curves and straight lines are combined, or leaf spring with cross-shape or Swastika-shape may be used. In this case, it is desirable that the shape of the inner guide is a shape along the shape of the leaf spring.

(7) The central portion of the tip of the conical base 322 of the weight 32 is not limited to the central shaft 324 and may be a central hole. The leaf spring 5 and the weight 32 may be fixed by inserting a pin to said central hole and the shaft hole 50 of the leaf spring 5 from the opening side of the casing body 10. Furthermore, when providing the central shaft 324, the shape of the shaft is not limited to circular shape, and may be other polygons such as triangle and quadrilateral.

Figure 11:
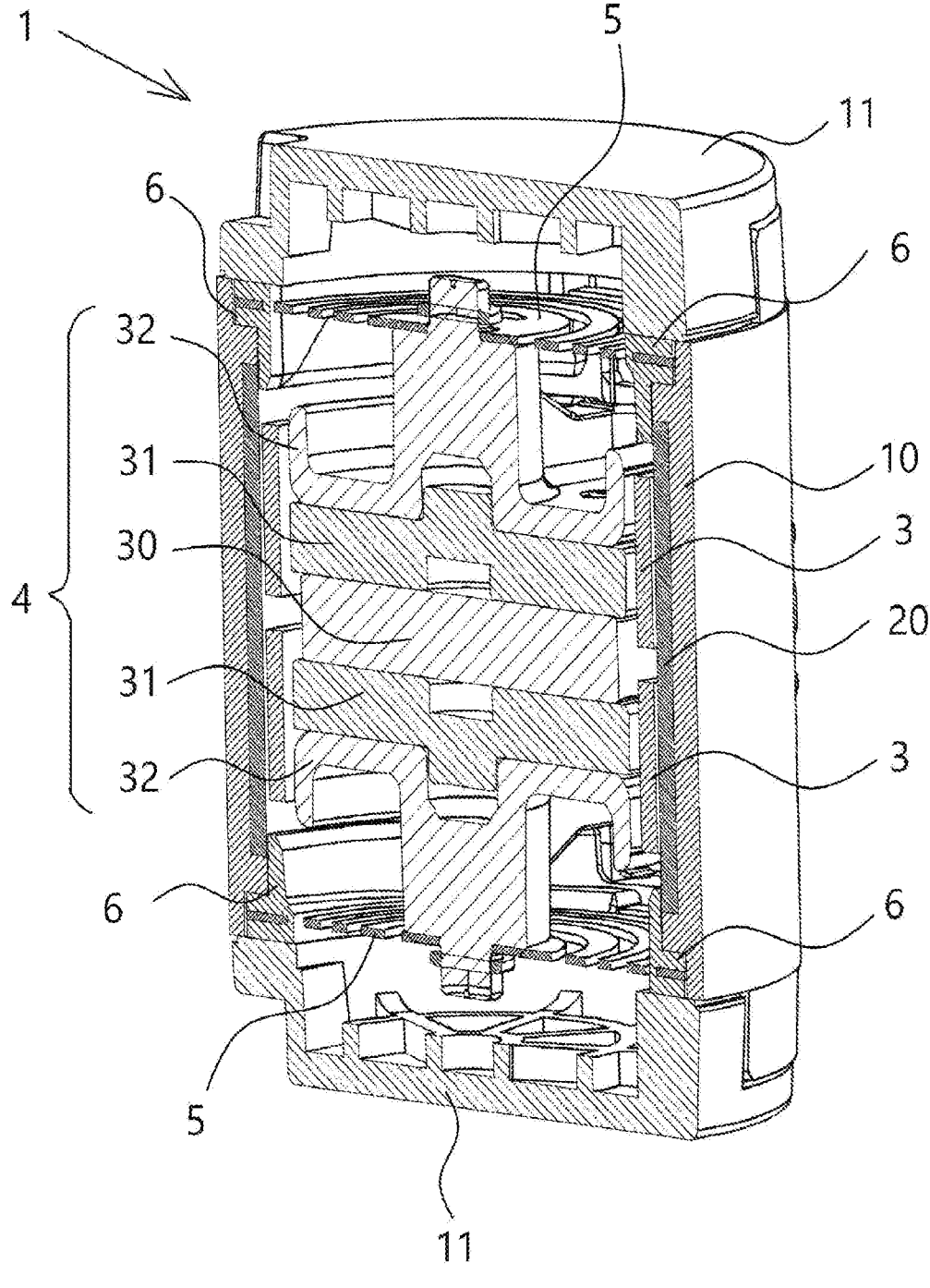
FIG. 11 is an exploded perspective view illustrating an entire configuration of other embodiment of the present disclosure.

(8) FIG. 11 is an exploded perspective view illustrating an entire configuration of the first embodiment in which the bobbin 21 is not provided in the coil 3. The coil 3 is arranged and fixed to the yoke 20 by adhesive and the like so as to have predetermined distance from the outer circumference of the mover 4. In the present embodiment, since the bobbin 21 is not provided in the coil 3, the design can be smaller.

Figure 12:
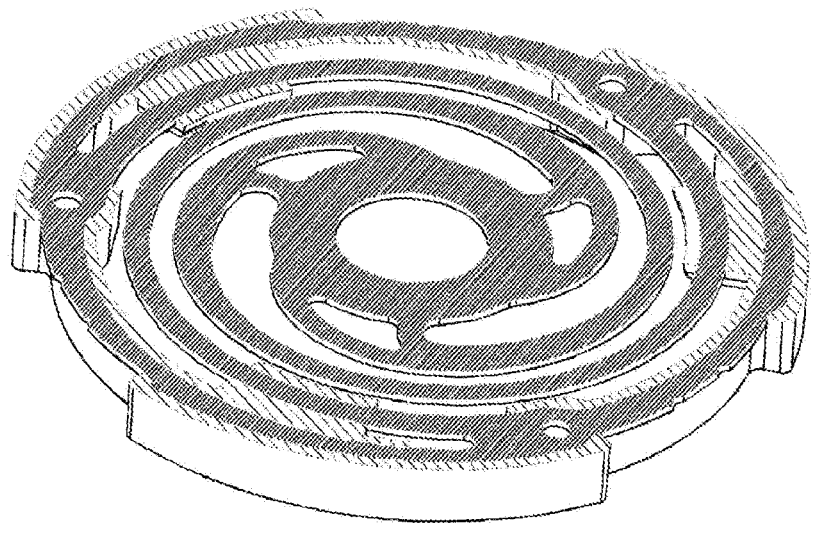
FIG. 12 is a horizontal and vertical cross-sectional view of a leaf spring and a frame view of other embodiment of the present disclosure.
Figure 12:
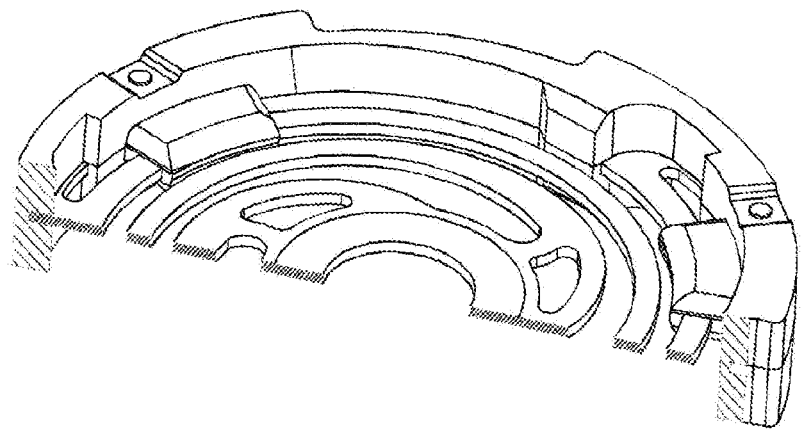

(9) FIG. 12 is a horizontal and vertical cross-sectional view of the leaf spring 5 and the frame 6 of the embodiment in which the through hole 53 is provided in the inner circumferential portion 54 of the leaf spring 5. In the present embodiment, three through holes having substantially triangular shape with rounded corners are provided along the shape of the inner circumferential portion of the arm 52. Note that the shape, number, and location of the through hole 53 are not limited. In the present embodiment, by providing the through hole 53 in the inner circumferential portion 54, the margin of the load stress to the radial direction (horizontal direction) of the leaf spring 5 can be increased. Therefore, in the present embodiment, the stress concentrated area will not be formed in the leaf spring 5, and the stable damping effect can be achieved. Furthermore, by providing the through hole 53 in the inner circumferential portion 54, the margin of the load stress to the amplitude direction (vertical direction) of the leaf spring 5 can be increased. Therefore, the rigidity of the leaf spring 5 itself can be easily reduced compared with the case in which the through hole 53 is not provided in the inner circumferential portion 54, and the broad vibration output designs can be made.

Figure 13:
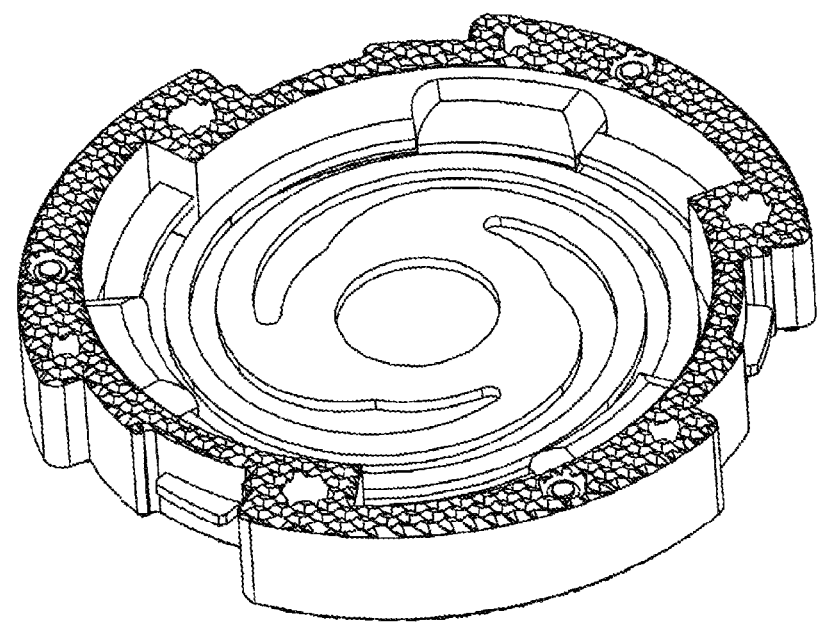
FIG. 13 is a horizontal and vertical cross-sectional view of a leaf spring and a frame view of other embodiment of the present disclosure.

(10) FIG. 13 is a horizontal and vertical cross-sectional view of the leaf spring 5 and the frame 6 of the embodiment in which the surface and back surface of the frame 6 are knurled. In the present embodiment, the friction force of the surface and back surface of the frame 6 can be increased by knurling. Therefore, the casing body 10 and the cover casing 11 are prevented from slipping and coming off when they are fixed to the frame 6 compared with the case without knurling. Note that although FIG. 13 illustrates net-like unevenness by knurling, the unevenness is not limited thereto, and unevenness with many alternate peaks and valleys may be provided or unevenness with many small protrusions may be provided. Texturing, blasting, and the like may be performed instead of knurling. Furthermore, only one of the surface and back surface of the frame 6 may be knurled, and the outer circumference of the fixing portion 61 in the frame 6 may be knurled.

The invention claimed is:

1. A vibration actuator comprising:
a casing;
a coil provided in the casing;
a mover that vibrates along a vibration-axis direction of the casing;
a leaf spring in which an inner circumferential portion thereof is fixed to the mover; and
a frame fixing the leaf spring to the casing;
wherein the frame includes a fixing portion provided in an outer circumferential portion of the leaf spring and a damping portion provided in a vibrating portion of the leaf spring, the vibrating portion includes an arm of the leaf spring, the arm is formed to connect the inner circumferential portion and the outer circumferential portion, and
wherein the fixing portion and the damping portion are molded integrally,
the damping portion is provided at a position spaced apart from a proximal end of the arm of the leaf spring, and the damping portion is formed by a protrusion protruding from the fixing portion toward the inner circumferential portion of the leaf spring, and
the damping portion interposes the arm of the leaf spring so as to hold a front surface and a rear surface of the arm.

2. The vibration actuator according to claim 1, wherein the frame and the leaf spring are overmolded.

3. The vibration actuator according to claim 1, wherein an engaging portion engaging to an engaged portion at a casing side is provided to the fixing portion.

4. The vibration actuator according to claim 1, wherein:
the damping portion is formed by the protrusion protruding inward than an inner diameter of the casing, and
a plurality of the protrusions is provided.

5. The vibration actuator according to claim 1, wherein the damping portion covers the leaf spring.

6. The vibration actuator according to claim 1, wherein a surface or back surface of the frame is knurled.

7. The vibration actuator according to claim 1, wherein the leaf spring includes an inner circumferential portion to which the mover is attached, an outer circumferential portion attached to the damping portion, and a plurality of arms connecting the inner circumferential portion and the outer circumferential portion.

8. The vibration actuator according to claim 7, wherein the damping portion is formed by molding and fixed with the arm.

9. The vibration actuator according to claim 7, wherein the arm has a through hole or a notch.

10. A vibration actuator comprising:

a casing;

a coil provided in the casing;

a mover that vibrates along a vibration-axis direction of the casing;

a leaf spring in which an inner circumferential portion thereof is fixed to the mover; and a frame fixing the leaf spring to the casing;

wherein the frame includes a fixing portion provided in an outer circumferential portion of the leaf spring and a damping portion provided in a vibrating portion of the leaf spring, wherein an engaging portion engaging to an engaged portion at a casing side is provided to the fixing portion, and wherein the frame includes the engaging portion from which a part of the leaf spring exposes, and the exposed portion of the leaf spring abuts with a positioning portion of the casing in the axial direction.

11. The vibration actuator according to claim 10, wherein a surface or back surface of the frame is knurled.

\*    \*    \*    \*    \*